Feb. 12, 1929.
T. E. MURRAY
1,702,057
FLEXIBLE SHAFT COUPLING
Filed July 19, 1927
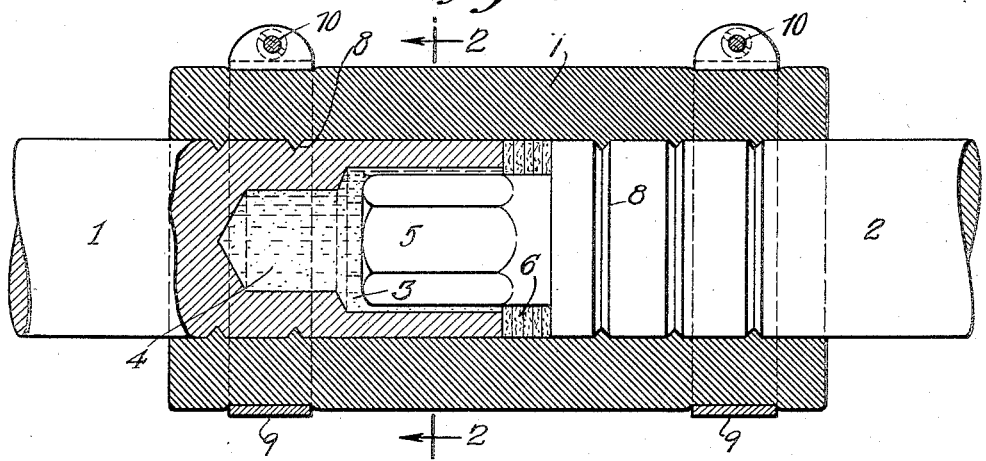
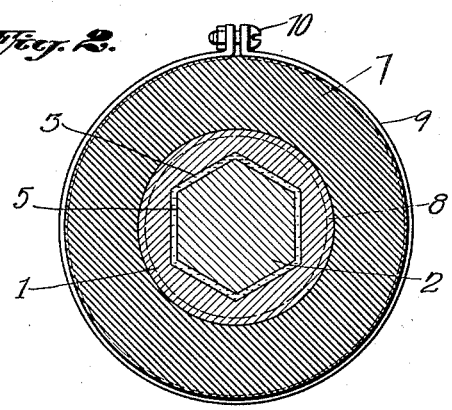
INVENTOR
THOMAS E. MURRAY.
BY
*D. Anthony Usina*, ATTORNEY Patented Feb. 12, 1929.

1,702,057

UNITED STATES PATENT OFFICE.

THOMAS E. MURRAY, OF BROOKLYN, NEW YORK.

FLEXIBLE SHAFT COUPLING.

Application filed July 19, 1927. Serial No. 206,904.

My invention aims to provide a shaft coupling of simple and economical construction which will permit a certain amount of play or angularity between the driving and driven members.

The accompanying drawings illustrate an embodiment of the invention.

Fig. 1 is a longitudinal section partly in elevation;

Fig. 2 is a section on the line 2—2.

The two shafts 1 and 2 are aligned with each other. The first has a recess 3 in its end of hexagonal or similar non-circular shape, and beyond this a recess 4 for carrying a supply of grease to ease any movement of the parts on each other.

The shaft 2 has on its end a projection 5 shaped to fit within the recess 3 with a slight play so that the rotation of either shaft will drive the other while permitting a certain rotative play between them and also a certain angular displacement of the longitudinal axes of the two shafts with respect to each other.

Between the end of the shaft 1 and a shoulder on the shaft 2 surrounding the projection 5, there is a packing ring 6 of felt or similar yielding material which holds the shafts properly spaced. The parts are held together by a sleeve 7 made of considerable thickness and of high grade rubber which will permit easy flexibility; and which will enter freely in grooves 8 around the end portions of the shafts and prevent longitudinal displacement of the latter with respect to each other.

For greater security the rubber may be compressed and clamped on the shafts by means of clamping rings 9 near the ends of the sleeve, which are fastened by screws 10 passing through flanges in the ends of the clamps.

The coupling permits a certain slight longitudinal play and a slight rocking of the shafts with respect to each other. The resiliency of the rubber, however, holds the parts against permanent displacement.

Various modifications may be made by those skilled in the art without departing from the invention as defined in the following claims.

What I claim is:

1. A flexible coupling comprising a pair of shafts and a rubber member engaging the ends of the shafts and transmitting the torque of one to the other, the end of one shaft also engaging the other with a slight rotative and angular play and adapted when such rotative play is taken up to make a positive driving connection.

2. A flexible coupling comprising a pair of shafts and a rubber sleeve embracing the ends of the shafts, holding them against lateral and longitudinal displacement and transmitting the torque of one to the other, the end of one shaft also engaging the other with a slight rotative and angular play and adapted when such rotative play is taken up to make a positive driving connection.

3. A flexible coupling comprising a pair of shafts and a rubber member engaging the ends of the shafts and transmitting the torque of one to the other, the end of one shaft also engaging the other with a slight rotative and angular play and adapted when such rotative play is taken up to make a positive driving connection and means for carrying a lubricant between the engaging ends of the shafts.

4. A flexible coupling comprising a pair of shafts and a rubber member engaging the ends of the shafts and transmitting the torque of one to the other, the end of one shaft also engaging the other with a slight rotative and angular play and adapted when such play is taken up to make a positive driving connection and a ring of yielding material between the ends of the shafts adapted to hold them properly spaced.

In witness whereof, I have hereunto signed my name.

THOMAS E. MURRAY.